UNITED STATES PATENT OFFICE.

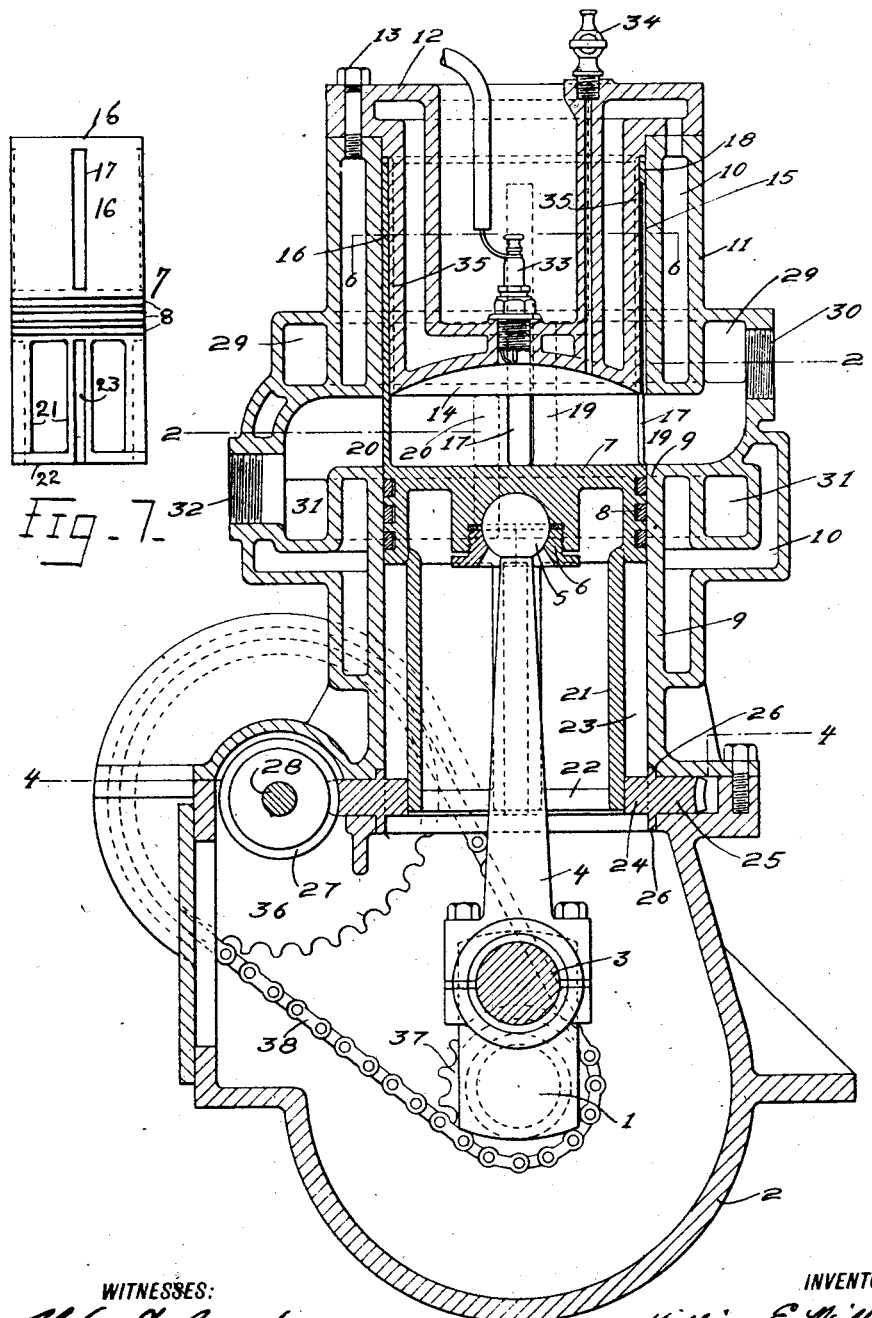

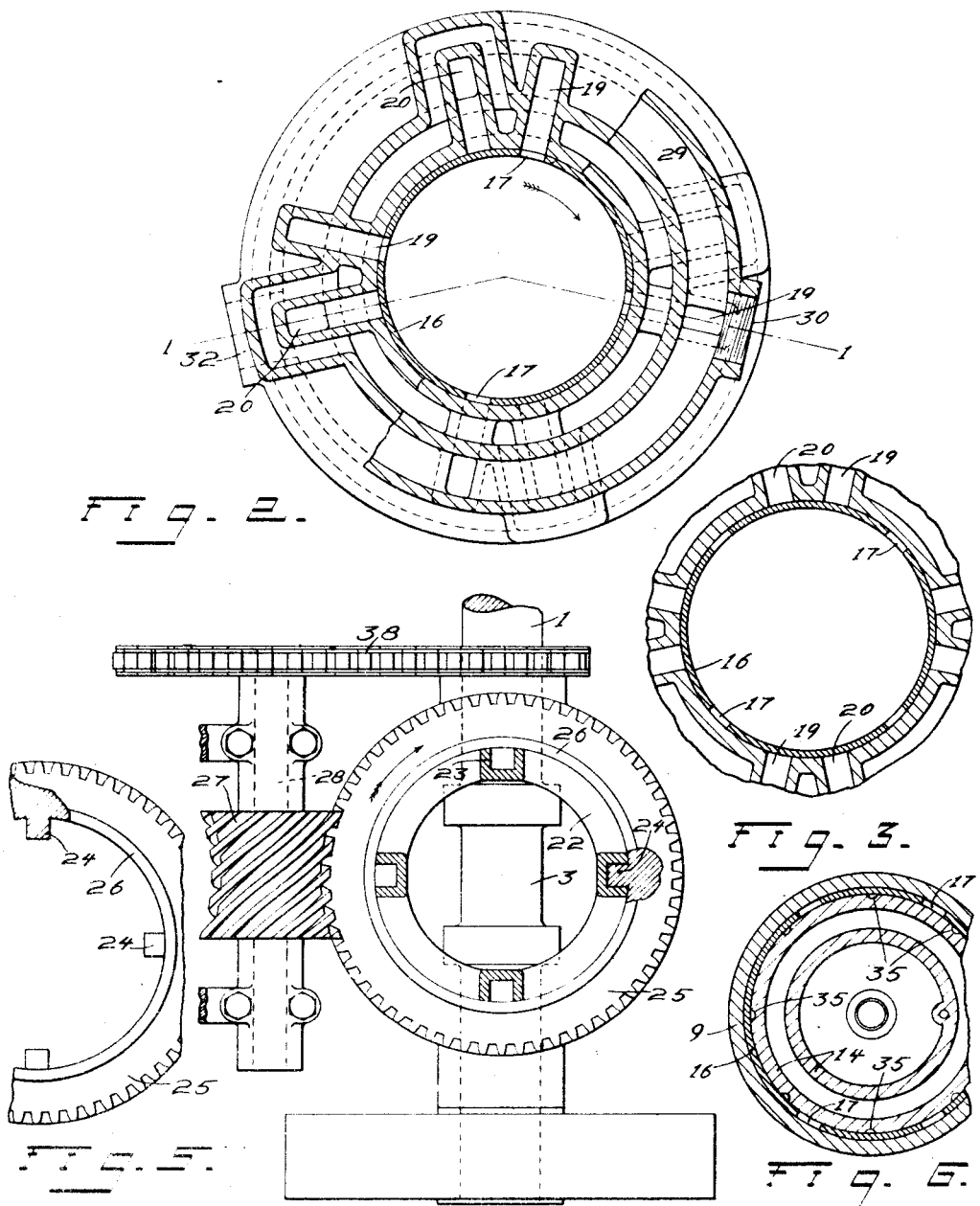

WILLIAM ERASTUS WILLIAMS, OF CHICAGO, ILLINOIS.

EXPLOSIVE-ENGINE.

1,100,166.  Specification of Letters Patent.  Patented June 16, 1914.

Application filed December 30, 1911. Serial No. 668,608.

*To all whom it may concern:*

Be it known that I, WILLIAM ERASTUS WILLIAMS, a citizen of the United States, residing at Chicago, in the county of Cook and State of Illinois, have invented a new and useful Improvement in Explosive-Engines, of which the following is a specification.

My invention relates to the valves and gearing therefor and may be used not only for explosive engines but for steam and air engines, compressor and pumps and the like.

A novel piston, serving also as a valve rotates as it reciprocates, and the invention resides chiefly in the piston and the means for causing its rotary movement.

Reference will be had to the accompanying drawings in which—

Figure 1 is a vertical section of the engine on line 1—1 of Fig. 2 as relates to the section through the ports. Fig. 2 is a plan section on line 2—2 of Fig. 1. Fig. 3 is a plan section with the outside broken away showing only the position of the ports when closed for compression and firing. Fig. 4 is a plan cross section on line 4—4 of Fig. 1 being at the top of the helical gear ring that revolves the piston. Fig. 5 is a plan of helical gear ring 25 alone, but with part broken off for lack of space on drawing. Fig. 6 is a plan section on line 6—6 Fig. 1 of a part of projection 14 showing the grooves 35. Fig. 7, Sheet 1 is an elevation of the piston, half size.

The drawings show what is known as a four cycle gas engine but this valve motion may be timed for any cycle of explosions.

In the drawing 1 indicates an ordinary crank shaft mounted in any suitable bearings in the frame or crank case 2. The crank 3 is connected to any suitable connecting rod 4 that is provided with a ball head 5 connected by any suitable socket joint 6 to a piston 7 packed by any suitable means or rings 8 into a cylinder 9 suitably cooled by any means or by the water spaces 10 inclosed at the sides by the jacket sections 11.

The cylinder head is made by a cap or plug 12 suitably secured on the top of the cylinder by screws 13 and provided with a projection 14 extending down into the cylinder leaving an annular groove or space 15 around the projection 14 and between it and the inside of the cylinder at the top portion of the latter. In the space 15 at the top of the cylinder there revolves and reciprocates a thin tubular or sleeve extension 16 of the piston 7. In the side of this tube or sleeve end 16 of the piston there are slots or ports 17 here shown as four in number. These slots 17 are closed at the top by connecting parts 18. The revolution of the piston causes the slots 17 to register at the required times with the intake ports 19 and the exhaust ports 20 in the cylinder wall.

The lower end of the piston is formed into a skeleton frame 21 leaving a connecting ring section 22. The purpose of this frame is to provide bearing slots 23 by means of which the piston is revolved as desired regardless of its position of reciprocation. The slots 23 are entered and driven in a rotary direction by projections 24 of a helical gear ring 25 mounted to revolve concentric with the axis of the cylinder and located between the crank case and the cylinder end. The helical gear 25 is provided with flange rings 26 which articulate in the crank case and the cylinder end, and serve to keep the ring concentric with the cylinder.

The helical gear ring 25 is driven by a helical pinion 27 mounted upon a side shaft 28 which corresponds to the general term of a "two to one shaft" in the Otto cycle engine practice. This shaft 28 may be driven by any suitable means but it is here shown as being driven by sprockets 36 and 37 through a chain 39 from the crank shaft. The timing of shaft 28 is made two to one only for convenience of making it the commutator shaft timing for the ignition, but the ratio of travel of the helical ring 25 and pinion 27 may be made as desired by varying the design of the helical gears.

The gearing here shown is intended to revolve the piston one fourth of one revolution to two revolutions of the crank shaft, but this may be increased or diminished as desired and in making such variations, the number and width of the slots in the tube or sleeve end 16 of the piston and the exhaust and intake ports 19 and 20 must be changed to suit the changes thus made.

The slots 17 are shown as extending vertically in a straight line the length of the stroke plus approximately the vertical length of the cylinder ports, and thus the time that any port is open is due to the time consumed by the slots 17 in revolving past the ports in the cylinder wall. This is a great desideratum as it permits any timing of the valve openings that can ordinarily be secured by any other valve mechanism.

Making the ports 19 and 20 wider or narrower or locating them around the cylinder wall in proper position in relation to the period of revolution of the piston makes the timing of intake and exhaust as desired so long as the cylinder is given a uniform rotary speed, as is here shown.

The intake ports 19 are all connected by the passage 29 to the intake pipe connection 30 whereat connection is made to the carbureter or source of intake supply. The exhaust ports 20 are all connected by the passage 31 to the exhaust outlet 32 where a suitable exhaust pipe may be attached. A spark plug 33 furnishes the ignition by any suitable electrical means. A vent cock 34 is provided to release compression when desired.

The sleeve or tube end 16 of the piston fits pretty closely into the annular space 15 around the projections 14 of the piston head to prevent as much as possible combustion taking place within the annular space as it is intended that what little gas enters here shall be spent gas. For safety against clogging with carbon and lubricating oil a series of small grooves 35 extend down the sides of the projection 14. See Figs. 1 and 6.

An important advantage is obtained by the sleeve or tube extension of the piston inclosing the combustion chamber, this construction keeping the fire away from the lubricated surfaces at all points, save at the narrow ports 17 in the tube and at the spent gas top space of the annular ring space 15. Since the piston is constantly revolving the space open through the slots 17 to the lubricated wall of the cylinder is only momentarily exposed or in other words the exposures of slots 17 are distributed over a considerably wider space of the cylinder wall leaving less time of intense heat on any one spot.

The cage or frame extension 21 with its slots 23 of the piston 7 may be made into a more or less complete ring and be provided with a series of slots or teeth in which the teeth of the helical pinion 27 may work thereby eliminating the helical gear ring 25 but with this construction there is added weight to the reciprocating piston load.

The tube end 16 of the piston may be a separate piece and properly secured to the piston head. The cage or frame extension 21 of the piston may also be a separate piece made of a malleable metal and very light. A kind of metal may be used for this cage or frame 21 that might not be permissible for the upper section of the piston, as no combustion occurs in contact with this frame part 21.

Suitable oil grooves and holes not shown in the drawing may be made to allow the splash lubrication of the crank case to oil all the working surfaces. Oil grooves and pockets may be so made in the cylinder and piston surfaces that by the rotating reciprocating movement of the piston any desired amount of oil may be carried up to lubricate the sleeve or tube end 16 of the piston.

By arranging a plurality of intake and exhaust ports and a plurality of slots in the tube or sleeve end of the piston, a large valve opening may be secured while at the same time requiring only a small amount of rotary movement of the piston. Hence with my construction one revolution of the piston is sufficient for 8 or more revolutions of the crank shaft and this may be increased as desired. The drawings are made to require one revolution of the piston to 8 revolutions of the crank shaft, yet a good form would be twice that namely one revolution of the piston to 16 revolutions of the crank in which case there would then be required 8 slots in the piston tube and 8 intake and exhaust ports. By lessening the number of revolutions of the piston relatively to those of the crank the friction in the cylinder is lessened.

The long sleeve or tube end of the piston permits the ports to be opened at any point of the stroke and further the thin tube walls are directly in contact with the cooled cylinder wall thereby being cooled which does not happen when a long flue is made in a section of a long piston as then a large area is open to be overheated by the combustion therein.

What I claim is:

1. In an engine of the class described, the combination with a cylinder having lateral ports, of a rotary reciprocating piston provided at one end with a tubular extension having lateral port openings in position to register with said ports as the piston rotates, and at the other end with a longitudinally grooved extension, and a circumferentially traveling piston rotating device engaging in said grooves, and imparting its own motion thereto.

2. In an engine of the class described, the combination of a rotary and reciprocating piston having ports in its side and a cylinder with ports in its side wall, with a revolving gear ring mounted to revolve concentric with the piston and in engagement therewith in a rotary direction but permitting a reciprocating motion of the piston transversely of the ring.

3. In an engine of the class described the combination of a rotating and reciprocating piston adapted to open and close ports in the walls of the cylinder by the rotation of the piston, said piston provided with a grooved end, with a revolving device for engaging the grooves of the piston and thereby moving the piston in a rotary direction for the purpose of opening and closing the valve ports.

4. In an engine of the class described, the combination with a reciprocating piston adapted to open and close ports in the cylinder by its own rotary movement, of rotating traveling devices peripherally engaging the piston and adapted to rotate it while permitting its free reciprocation.

5. In an engine of the class described, the combination with a rotary reciprocating piston adapted to open and close the cylinder ports by its own rotary movement and provided with an extension at the open end of the cylinder, of a rotary gear ring encircling said extension and adapted to compel its rotation while allowing it to reciprocate freely.

6. In an engine, a reciprocating and rotating piston adapted to open and close ports in the cylinder wall by rotary movement, said piston provided with a plurality of slotted openings extending parallel to the axis of the cylinder, with a plurality of intake and exhaust ports whereby a large area of valve opening may be secured with a slight rotary movement of the piston.

7. In an engine, a rotating and reciprocating piston provided with a sleeve or tube extension wherein the combustion chiefly takes place, slots in the wall of this sleeve or tube that are adapted to register with the openings in the wall of cylinder by rotary movement, the arrangement of the slots in the sleeve or tube and the openings in the cylinder wall so arranged that a complete port opening may be had during the entire length of the stroke.

8. In an engine, a reciprocating and rotating piston adapted to open and close by rotary movement the ports in the wall of the cylinder, a helical gear ring adapted to directly engage and carry in circular movement the piston, a helical pinion gear adapted to engage and revolve the helical gear ring.

9. In an engine of the class described, a reciprocating and rotating piston adapted by its rotation to open and close ports in the side wall of the cylinder, gearing connected at the lower end of the piston for revolving the piston and a side shaft for actuating the gearing.

10. In an engine of the class described, the combination with a cylinder having lateral ports, of a rotary reciprocating piston having a thin longitudinally slotted tubular extension in which explosion occurs, the thin wall of the extension forming the only heat insulation between the cylinder walls and the combustion space, and the slots in said wall being adapted to secure port opening approximately throughout the stroke.

In witness whereof I have hereunto subscribed my name, in the city of New York, in the State of New York, on the 26th day of December 1911, in the presence of two subscribing witnesses.

WILLIAM ERASTUS WILLIAMS.

Witnesses:
H. L. DRULLARD,
WALLACE GREENE.